United States Patent [19]

Ogawa

[11] 3,714,443

[45] Jan. 30, 1973

[54] REMOTELY CONTROLLED LIGHT SENSING APPARATUS

[75] Inventor: Francis T. Ogawa, Denver, Colo.

[73] Assignee: Honeywell Inc., Minneapolis, Minn.

[22] Filed: Jan. 22, 1971

[21] Appl. No.: 108,876

[52] U.S. Cl............250/214 P, 95/10 R, 307/252 A, 307/311, 315/151, 315/241 P, 328/2
[51] Int. Cl..............................................H01j 39/12
[58] Field of Search...307/252 A, 252 B, 252 K, 305, 307/311; 328/67, 1-5; 315/151, 157, 241 P; 250/205, 214 P; 95/10 R, 10 A, 10 B

[56] References Cited

UNITED STATES PATENTS

| | | | |
|---|---|---|---|
| 3,517,255 | 6/1970 | Hoffer et al. | 315/151 |
| 3,519,879 | 7/1970 | Ogawa | 315/151 |
| 3,541,387 | 11/1970 | Ackermann | 315/151 |
| 3,568,582 | 3/1971 | Uchida et al. | 250/205 X |

*Primary Examiner*—Stanley D. Miller, Jr.
*Attorney*—Arthur H. Swanson and Lockwood D. Burton

[57] ABSTRACT

A light control system includes a switching means, a sensing transmitter, and a flash device, connected serially, with the sensing transmitter connected to the flash device by only two wires. The switching means is selectively operable for providing a contact closure to effect the apparent production of a light from the flash device for the illumination of a scene to be photographed. Gating means is responsive to a signal indicative of the firing of the flash device to activate the normally insensitive sensing transmitter to receive light from the scene. A signal to effect the apparent termination of the light provided by the flash device is generated by the sensing transmitter when sufficient light is received from the scene. Dynamic anticipation means provides a time varying compensation for the light intensity-time variation characteristic of flash devices.

14 Claims, 2 Drawing Figures

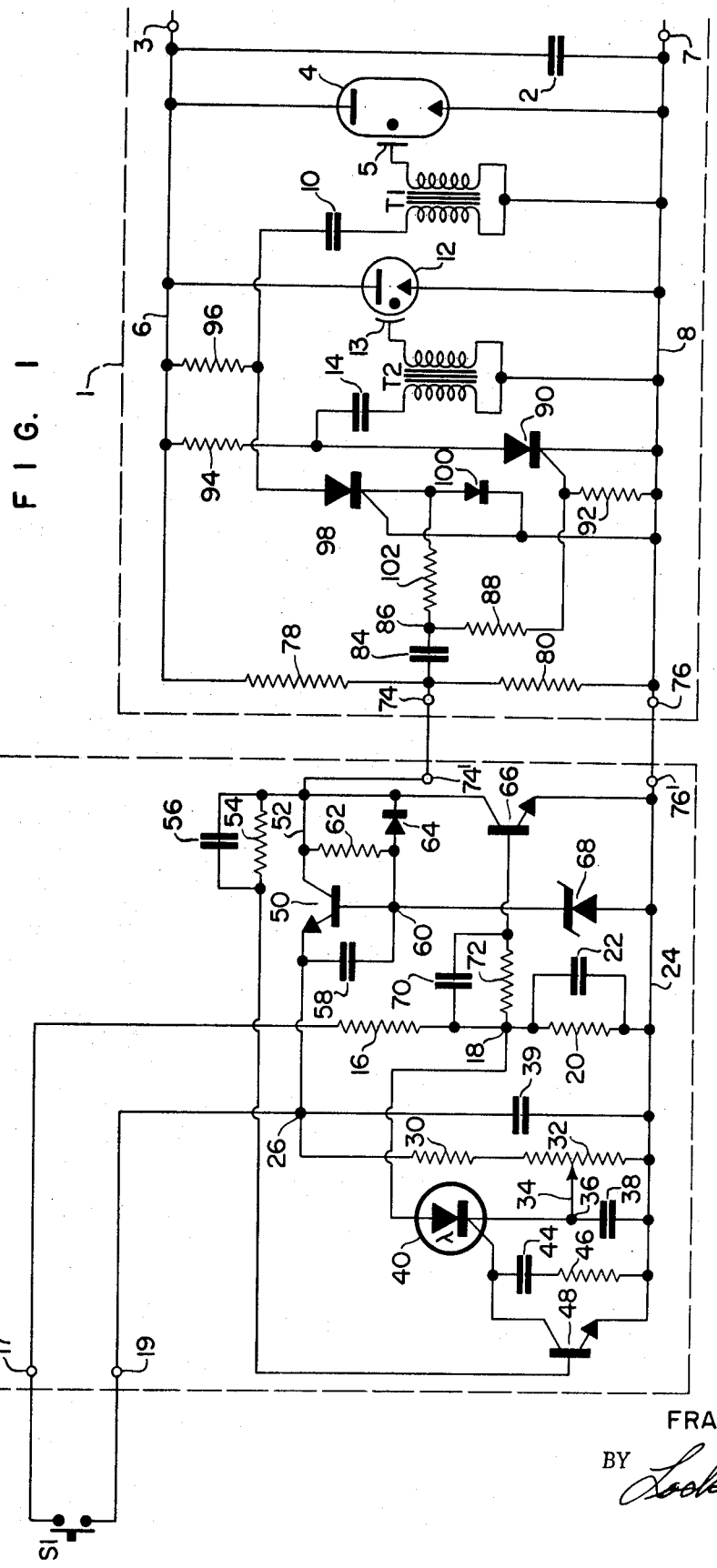

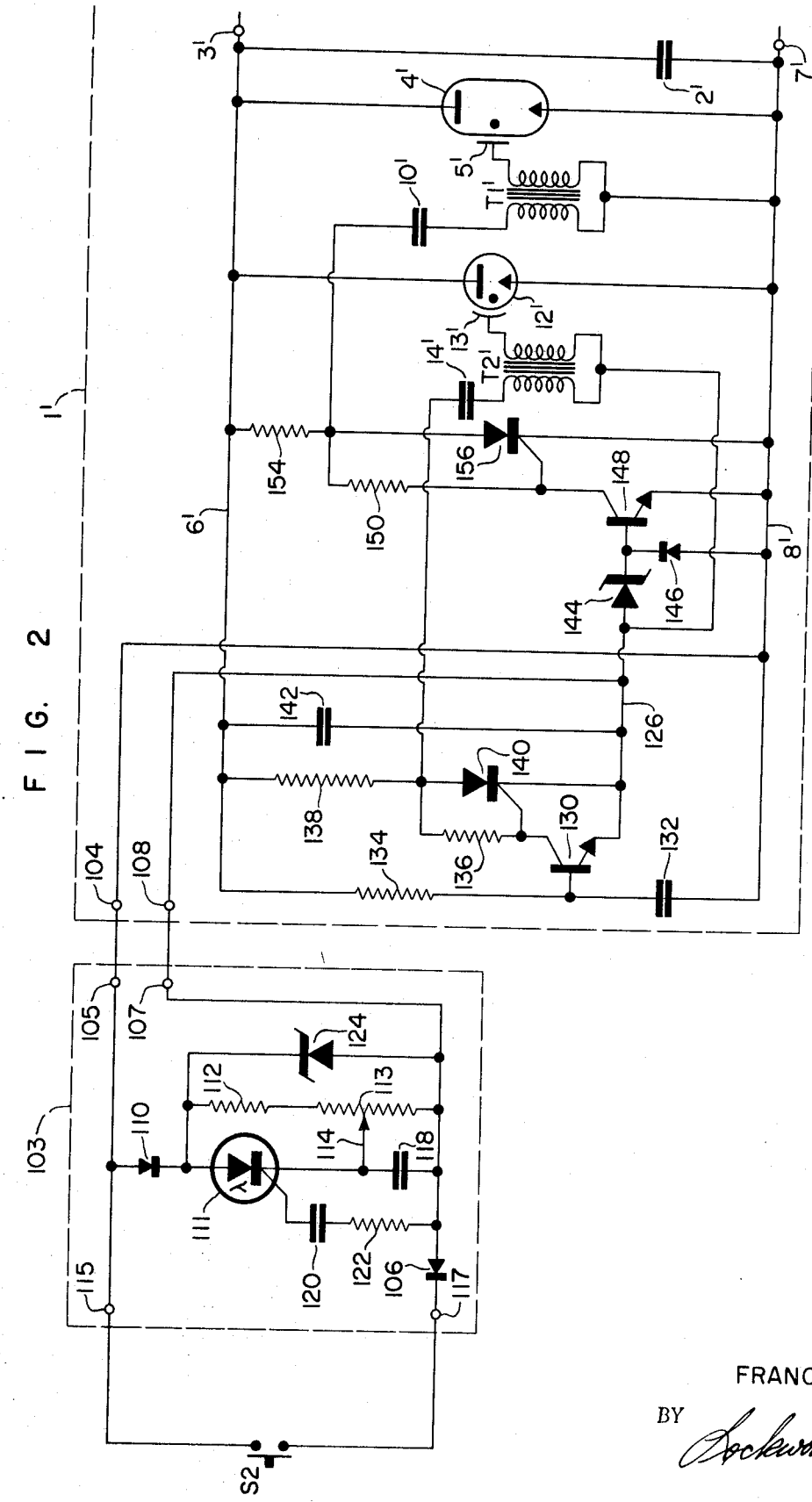

3,714,443

REMOTELY CONTROLLED LIGHT SENSING APPARATUS

The subject matter disclosed but not claimed herein is disclosed and claimed in the copending application of Francis T. Ogawa Ser. No. 108,878 and the copending application of Roger D. Erickson Ser. No. 108,877, both filed on even date herewith.

The present invention relates generally to light controlling systems and more particularly to an improved sensing transmitter for use with systems using computer flash techniques.

Electronic photographic flash systems are known in the art in which the flash of light produced by the flash tube of the system is automatically terminated by light responsive sensing transmitter after a predetermined total quantity of light has been received from the scene being photographed. While such sensing transmitters have been generally satisfactory, there has still existed a need for improved sensing transmitters wherein the actuation of the light terminating means is effected even more accurately and more reliably under varying conditions than has been realized through the use of prior art devices.

Specifically, there has existed a need for an improved sensing transmitter having greater accuracy, that is, means wherein precisely the same total quantity of light from a subject is caused to reach a light sensitive film in a camera regardless of the camera to subject distance. It has been the tendency of previously known sensing transmitters to provide excessive amounts of light when the camera to subject distances are small.

In prior art photographic systems, a light sensing transmitter has been mounted on or formed as part of a flash device which in turn has been connected to a camera means with the standard two conductor connection therebetween. When, however, a light sensing transmitter is mounted on or made a part of the camera means, a minimum of three conductors has been required to connect the combination camera-light sensing means with an associated flash device. Additionally, distinct advantages may be obtained by a photographer when the light sensing transmitter of a computer-flash system is used as an independent member of the system, detached from both the camera means and the flash device as shown in copending application of Roger D. Erickson, Ser. No. 108,877. That arrangement is similar to the first mentioned arrangement in that at least a three wire connection has been required between the sensing transmitter and the flash device. Since two wire cables and connections are of standard manufacture, there is a need for a light sensing transmitter requiring only a two wire connection between the light sensing transmitter and the flash device.

There has also existed a need for an improved light sensing transmitter having greater reliability, specifically, a sensing transmitter which prevents a light terminating means from being actuated by extraneous conditions or events, and is enabled only when it properly should be, that is, when the flash tube of the flash device itself has been fired. The previously known sensing transmitters have often exhibited deficiencies in this respect.

It is accordingly an object of the present invention to provide an improved sensing transmitter which obviates the disadvantages of the prior art sensing means.

It is another object of the present invention to provide an improved sensing transmitter which dynamically compensates for various subject-to-camera distances automatically.

It is a further object of the present invention to provide an improved sensing transmitter compatible with computer flash systems in which the reliability of operation is increased by preventing the untimely operation of the flash device, that is, by preventing the light producing function from being initiated by noise, the flashing of other flash devices, and other extraneous causes.

It is still a further object of the present invention to provide an improved sensing transmitter compatible with computer flash systems wherein the firing of the flash device is the sole condition which enables the sensing transmitter to become operative.

In accomplishing these and other objects, there has been provided in accordance with the present invention, an improved sensing transmitter for use with a switching means and a flash device. The switching means may be included as part of a camera means. The above mentioned means are connected serially with the connection between the sensing means and the flash device comprising only two conductors. The switching means is selectively actuated to activate the flash device for providing a source light which illuminates a scene. When the flash device is activated, the sensing transmitter is enabled and beings to sense the scene light or the light received from the illuminated scene. When the sensing transmitter has received a predetermined amount of light from the illuminated scene, a light terminating signal is produced. Dynamic anticipation means is included in the sensing transmitter whereby the predetermined quantity required to produce the light terminating signal is varied with time, thereby minimizing the unavoidable overexposure error when the distance between the object being photographed and the camera means is relatively small. The light terminating signal is received by the flash device and is effective to apparently terminate the light emitted from the flash device.

A better understanding of the present invention may be had from the following detailed description when read in connection with the accompanying drawings in which:

FIG. 1 is a schematic diagram of a light controlling system employing one embodiment of the sensing transmitter of the present invention.

FIG. 2 is a schematic diagram of a light controlling system employing a second embodiment of the sensing transmitter of the present invention.

Referring in more detail to FIG. 1, there is shown a control apparatus exemplified by a flash or light producing device, including a capacitor 2 connected between two terminals 3 and 7. The two terminals 3 and 7 are connected to the usual capacitor charging means which are not shown in FIG. 1. Such capacitor charging means are well known in the art and it is sufficient to say that the capacitor 2 is normally maintained in the charged state by the aforementioned capacitor charging means whereby a relatively high voltage is maintained across the capacitor 2. The high voltage terminal 3 is connected to a bus 6 and the common terminal 7 is connected to a bus 8. A flash tube or light producing tube 4 is shown with its anode connected to the bus 6 and its cathode connected to the bus 8. A light triggering terminal 5 of the flash tube 4 is coupled through a transformer T1 to one terminal of a capacitor 10. The other terminal of the capacitor 10 is connected to the anode terminal of an SCR 98. The common terminal of the transformer T1 is connected to the bus 8. A light terminating tube or quench tube 12 is shown connected between the bus 6 and the bus 8. A triggering terminal 13 of the quench tube 12, is connected through a transformer T2 to one terminal of a capacitor 14. The other terminal of the capacitor 14 is connected to the anode of a second SCR 90. The common terminal of the transformer T2 is connected to the common bus 8.

The flash device 1 has two input terminals 74 and 76. Input terminal 76 is connected to the common bus 8. The common bus 8 is connected through two resistors 80 and 78 to the common bus 6. The common point between the two resistors 78 and 80 is connected to the signal receiving means input terminal 74 and also through a capacitor 84 to a common point 86. The common point 86 is connected through a resistor 88 to the gate terminal of a silicon controlled rectifier (SCR) 90. The gate terminal of the SCR 90 is also connected to the common bus 8 through a resistor 92. The cathode terminal of the SCR 90 is directly connected to the common bus 8 while the anode terminal is connected to the capacitor 14. The common point 86 is connected through a resistor 102 to a common point between the cathode of the SCR 98 and the anode terminal of a diode 100. The gate terminal of the SCR 98 is connected to the cathode terminal of the diode 100 which is in turn connected to the common bus 8. The common point between the anode of the SCR 98 and the capacitor 10, is connected to the bus 6 through a resistor 96. The common point between the anode of the SCR 90 and the capacitor 14, is connected to the bus 6 through a resistor 94. A light sensing transmitter 15 has a first pair of terminals 17 and 19. The transmitter 15 may be remotely located from the control apparatus 1. The terminals 17 and 19 may be connected to any switching means, either manual or automatically controlled, to provide a closed contact. In a photographic system the input terminals 17 and 19 may be connected to a shutter switch of a camera shown in FIG. 1 as S1. Input terminal 17 is connected through a resistor 16 to a common point 18. The parallel combination of a resistor 20 and a capacitor 22 connects the common point 18 to a common bus 24 of the light sensing means 15. The other input terminal 19 is connected to a bus 26. The bus 26 is connected through two resistors 30 and 32 to the common bus 24. The resistor 32 has a sliding arm 34 which connects to a junction 36. Capacitor 38 connects the junction 36 to the common bus 24. A sensing means exemplified by light activated silicon controlled rectifier (LASCR) 40 provides a cathode to the anode connection from the junction 36 to the common point 18. The gate electrode of the LASCR 40 is connected through a capacitor 44 and a resistor 46 to the common bus 24. A capacitor may be connected between the gate and cathode terminals of any LASCR shown in the drawings to insure against undesirable noise triggering the LASCR. The collector-emitter path of an NPN transistor 48 connects the gate terminal of the LASCR 40 to the common bus 24. The base terminal of the transistor 28 is connected through a resistor 54 to a bus 52. A capacitor 56 is connected across the resistor 54. The bus 52 is connected to the bus 26 through the collector emitter path of an NPN transistor 50. A capacitor 39 connects the bus 26 to the common bus 24. The base terminal of the NPN transistor 50 is connected to a common point 60 which is in turn connected through the cathode to anode path of a zener diode 68 to the common bus 24. The common point 60 is connected to the collector terminal of the transistor 50 through a resistor 62. A capacitor 58 is connected between the emitter terminal of the transistor 50 and the common point 60. The common point 60 is also connected to the anode of a diode 64, the cathode of which is connected to the bus 52. The bus 52 is connected to the bus 24 through the collector-emitter path of an NPN transistor 66. The base terminal of the transistor 66 is connected through a resistor 72 to the common point 18. A capacitor 70 is connected across the resistor 72. The bus 52 and the bus 24 are connected to a second pair of terminals 74' and 76', respectively. The second pair of terminals 74' and 76' are connected to the correspondingly designated input terminals 74 and 76 of the flash device 1.

In FIG. 1, with the SCR 98 nonconducting, the resistor 96 provides a charging path from the high voltage bus 6 to the capacitor 10. The capacitor 10 of FIG. 1 will be charged to a steady-state value. When the SCR 98 goes into conduction it provides a low impedance discharge path for the capacitor 10. The capacitor 10 is then rapidly discharged. That action includes a triggering pulse to appear at the flash tube triggering terminal 5 and initiates conduction in the flash tube 4. Since the rapid discharge of the capacitor 10 produces a ringing action in the LC circuit of the capacitor 10 and the transformer T1, the SCR 98 will automatically turn off after a triggering pulse has been provided and when the SCR 98 anode voltage is reduced to a level below the threshold voltage of the SCR 98. Similarly, the resistor 94 provides a connection between the high voltage bus 6 and the capacitor 14. The capacitor 14 of FIG. 1 is charged to a steady state value. When the SCR 90 is made conductive a discharge path is provided for the capacitor 14 and a rapid discharge will occur. That rapid discharge will induce a triggering pulse to appear at the triggering terminal 13 of the quench tube 12. The quench tube 12 will then begin conduction and the flashtube 4 will turn off since the quench tube 12 has a much lower conducting impedance than the flashtube 4 and the capacitor 2 is effectively short-circuited. The SCR 90 will automatically turn off after a triggering pulse has been provided to the quench tube 12. The automatic turn-off is a consequence of the ringing action through the circuit of the capacitor 14 and the transformer T2. A voltage decrease appearing at the input terminal 74 of the flash device 1 will be coupled through the capacitor 84 and the resistor 102 to the cathode terminal of the SCR 98. The circuit biasing components associated with the SCR 98 are valued so that when the negative going signal or voltage decrease appears at the input terminal 74, the SCR 98 will become conductive and cause the flashtube to begin conduction. Similarly, when a positive going signal or voltage rise appears at the input terminal 74 of the flash device 1, the SCR 90 becomes conductive which causes the operation of the quench tube and the ultimate termination of the light given off by the flash tube 4. Therefore, when the switch S1 is closed, or first control signal is provided which is operative to effect a first control function, i.e., the operation of the flashtube and thereby produce an effect, i.e., the production of light. A second control signal is subsequently produced by the sensing transmitter 15 which is operative to effect a second control function, i.e., the operation of the quench tube 12.

The light sensing transmitter 15 operates to transmit the first control signal to the remotely located control apparatus and to generate the second control signal as is hereinafter explained. The first terminals 17 and 19 of the sensing transmitter 15 may be connected to any switching means of a light controlling system but for purposes of the present example it will be assumed that the terminals 17 and 19 are connected to the shutter switch of an associated camera as may be used in a photographic system. Generally in the operation of computer flash devices used in photographic systems, the shutter switch of a camera is closed and a light producing means is initiated, thereby providing light for a scene to be photographed. A light sensing transmitter measures the light received from the scene to be photographed and is effective to terminate the apparent light given off by the flash device when a predetermined amount of light has been received by the sensing means.

In FIG. 1, the voltage appearing at the high voltage bus 6 is divided by the resistors 78 and 88; the resultant is applied to the output terminal 74' of the sensing means 15. The biasing circuitry associated with the transistor 50 effects the conduction of the transistor 50 when the steady state voltage appears at the output terminal 74'. The current flowing through the transistor 50 charges the capacitor 39 to a steady state voltage. That voltage is divided by the two resistors 30 and 32. Normally there is an open contact between the input terminals 17 and 19 of the sensing means 15, and therefore, no voltage appears at the common point 18. Since no voltage is at the common terminal 18, the transistor 66 is nonconductive and there is no power applied to the sensing means or LASCR 40. The voltage at the output terminal 74' of the sensing means 15 is applied to the base terminal of the transistor 48 through resistor 54. The transistor 48 is biased into conduction, thereby providing a discharge path for the capacitor 44. When the LASCR 40 is enabled, a current representative of the light received by the LASCR 40 is generated through the LASCR gate terminal and accumulates on the capacitor 44. Since normally the transistor 48 is conductive, no charge is allowed to be stored on the capacitor 44, thereby eliminating the possibility that the LASCR 40 will be actuated by ambient light.

When a switching means, such as the shutter switch of the camera, provides a closed contact between the input terminals 17 and 19 of the sensing means 15, the voltage stored by the capacitor 39 causes a current to flow from the bus 26 through the terminals 17 and 19 and through the resistor 16 to the common point 18 and then through the resistor 20 to the common bus 24. The capacitors 22 and 70 accumulate a charge representative of the voltage appearing at point 18. This voltage is effective to turn on the transistor 66. When the transistor 66 begins to conduct, the voltage appearing at the output terminal 74' of the light sensing means 15 exhibits a sudden decrease. This sudden decrease in voltage at terminal 74' represents an electrical effect or signal which causes the flashtube 4 to fire. The voltage decrease appearing at the terminal 74' is coupled through the diode 64 to the base terminal of the transistor 50. Therefore when the transistor 66 beings conduction, the transistor 50 is turned off. The decrease in voltage at the terminal 74' is also coupled to the base terminal of the transistor 48 through the resistor 54; the transistor 48 ceases conduction. With an enabling voltage present at the common point 18 and the transistor 48 nonconducting, the sensing means or LASCR 40 is enabled to generate a sensor signal or current through its gate terminal representative of the amount of light received from a scene being illuminated by the flashtube 4. That current is accumulated on the integrating capacitor 44. The resistor 46 provides a measure of anticipation as described in U.S. Pat. No. 3,519,879. The charge stored by the capacitor 38, as represented by the voltage at the point 36, provides a threshold voltage which must be exceeded by the LASCR gate voltage before conduction in the LASCR 40 is effected. The threshold voltage therefore predetermines the amount of light which must be received by the LASCR 40 before the LASCR 40 becomes conductive. When the voltage, as represented by the charge stored on the capacitor 44 biased by the voltage drop across the resistor 46, and the voltage as represented by the charge stored on the capacitor 38, attain a predetermined relationship, the LASCR 40 becomes conductive. When the LASCR 40 becomes conductive, a relatively low resistance path is provided for the common point 18 to the common bus 24. The capacitors 22 and 70 will now discharge through the LASCR 40, and the voltage at the common point 18 will decrease, thereby turning off the transistor 66. When the transistor 66 is turned off, the voltage at the output terminal 74' will appear to suddenly increase. That increase in voltage will initiate the operation of the quench tube and thereby terminate the apparent light from the flash tube 4. After the initiation of conduction in the quench tube 12, the charge stored on the capacitor 2 will rapidly discharge through the quench tube 12 and when the voltage on the anode of the quench tube drops to a value insufficient to support ionization of the tube, the quench tube 12 will again return to its normal nonconductive state. As the quench tube 12 is discharging, the ringing voltage appearing at the anode terminal of the SCR 90 will effect self turn-off of the SCR 90; the SCR 90 will return to its normally nonconductive state. After the quench tube and the flash tube cease conduction, the high voltage storing capacitor 2 is again recharged to a steady state value. The transistor 50 will again be biased into conduction and begin to re-charge the capacitor 38. The restored high voltage at the output terminal 74' is coupled through the resistor 54 to the base of the transistor 48 and causes the transistor 48 to again become conductive thereby discharging the capacitor 44. After the charges on the capacitors 22 and 70 have been released through LASCR 40, the voltage at the common point 18 drops to a level whereby the LASCR 40 is disabled and the system is ready for another cycle.

In FIG. 2, components similar to those in FIG. 1 are designated with the numeral shown in FIG. 1 as modified by a prime. FIG. 2 shows a control apparatus exemplified by a light producing or flash device 1' including a capacitor 2' connected between two terminals 3' and 7'. The two terminals 3' and 7' are connected to the usual capacitor charging means which are not shown in FIG. 2. Such capacitor charging means are well known in the art and it is sufficient to say that the capacitor 2' is normally maintained in the charged state by the aforementioned capacitor charging means whereby a relatively high voltage is maintained across the capacitor 2'. The high voltage terminal 3' is connected to a bus 6' and the terminal 7' is connected to a common bus 8'. A flash or light producing tube 4' is shown with its anode connected to the bus 6' and its cathode connected to the bus 8'. A light triggering terminal 5' of the flash tube 4' is coupled through a transformer T1' to one terminal of a capacitor 10'. The other terminal of the capacitor 10' is connected to the anode terminal of an SCR 156. The common terminal of the transformer T1' is connected to the bus 8'. A light terminating or quench tube 12' is shown connected between the bus 6' and the bus 8'. A triggering terminal 13' is connected through a transformer T2' to one terminal of a capacitor 14'. The other terminal of the capacitor 14' is connected to the anode terminal of a second SCR 140. The common terminal of the transformer T2' is connected to a bus 126.

A capacitor 142 connects the bus 6' with the bus 126. The bus 126 is connected to the anode of a zener diode 144. The cathode terminal of the zener diode 144 is connected to a common point between the base terminal of an NPN transistor 148 and the cathode terminal of a diode 146. The anode terminal of the diode 146 is connected to the common bus 8'. The collector terminal of the transistor 148 is connected through a resistor 150 to the anode terminal of the SCR 156. The bus 6' is connected to the anode terminal of the SCR 156 through a resistor 154. The gate terminal of the SCR 156 is connected to the collector terminal of the transistor 148, and the cathode terminal of the SCR 156 is connected to the common bus 8'. The emitter terminal of the transistor 148 is also connected to the common bus 8'. An input terminal 108 of the flash device 1' is connected to the bus 126, and the other input terminal 104 of the flash device 1' is connected to the common bus 8'. The bus 126 is connected to the emitter terminal of an NPN transistor 130. The base terminal of the transistor 130 is connected through a capacitor 132 to the common bus 8'. The base terminal of the transistor 130 is also connected through a resistor 134 to the high voltage bus 6'. The collector terminal of the transistor 130 is connected through two resistors 136 and 138 to the high voltage bus 6'. The common point between the two resistors 136 and 138 is connected to the anode terminal of the SCR 140. The gate terminal of the SCR 140 is connected to the collector terminal of the transistor 130 and the cathode terminal of the SCR 140 is connected to the bus 126. A sensing transmitter 103, which is remotely located from the control apparatus 1; has a pair of first terminals 115 and 117. The input terminal 115 is connected directly to one terminal 105 of a pair of second terminals 105 and 107. The other input terminal 117 is connected through the cathode to anode path of a diode 106 to the other terminal 107 of the second terminals. The input terminals 115 and 117 may be connected externally to a shutter switch S2 of an associated camera as hereinbefore explained in connection with FIG. 1. The input terminal 115 is connected through the anode to cathode path of a diode or gating means 110 to the anode terminal of a sensing means or light activated silicon controlled rectifier (LASCR) 111. The anode terminal of the LASCR 111 is also connected through two resistors 112 and 113 to the terminal 107 of the second terminals. The resistor 113 has a slider 114 connected to a junction point 116. The point 116 is connected to the cathode terminal of the LASCR 111 and also through a capacitor 118 to the terminal 107. The gate terminal of the LASCR 111 is connected through the series connection of a capacitor 120 and a resistor 122 to the terminal 107. The anode terminal of a zener diode 124 is connected to the terminal 107 and its cathode terminal is connected to the anode terminal of the LASCR 111. The second terminals 105 and 107 of the sensing means 103 are connected to input terminals 104 and 108 of the flash device 1'.

The circuits shown in FIG. 2 perform the same general functions as the circuits shown in FIG. 1, however, the sensing transmitter 103 of FIG. 2 is a much simpler device than the sensing transmitter 15 shown in FIG. 1. Additionally, the sensing transmitter 103 provides for an enhanced dynamic anticipation as is hereinafter explained. The normally unpowered feature of the light sensing means 15 of FIG. 1 is retained in the light sensing means 103 of FIG. 2 as is the need for only a two conductor connection between the sensing transmitter and the flash device. The capacitor 10' of the flash device 1' is charged from the high voltage bus 6' through the resistor 154. The capacitor 14' of the light producing means is similarly charged from the high voltage bus 6' through the resistor 138. The transistor 130 is so biased that it is normally conducting, in a steady state condition. The transistor 148 is similarly so biased that it is normally conducting. With the transistor 130 conducting, the gate terminal of the SCR 140 is effectively clamped to its cathode terminal and is therefore non-conductive. Similarly with the transistor 148 conducting the gate terminal of the SCR 156 is effectively clamped to its cathode terminal thereby precluding conduction. When a switching means, for example the shutter switch S2 of an associated camera, provides a contact closure between the input terminals 115 and 117 of the sensing transmitter 103, a current flows from the bus 126, through the diode 106, to the bus 8. At that time, the LASCR will be still disabled since the diode 110 is reverse biased. The voltage on the bus 126 decreases since a lower resistance path (diode 106) is now present between the buses 126 and 8' than was present before the switch S2 closure (zener 144 and base emitter path of transistor 148). The lower voltage on the bus 126 with respect to the bus 8' will cause the transistor 148 to turn off. With the transistor 148 open, a current will flow through the resistor 150 and into the gate terminal of the SCR 156, thereby rendering it conductive. With the SCR 156 conducting, a relatively low resistance path rapidly discharges the capacitor 10', thereby initiating the light producing function of the flash tube 4' as hereinbefore explained. As the flash tube 4' begins to conduct, the voltage on the bus 6' is suddenly reduced as the charge on the capacitor 2' is dumped through the flash tube 4'. That sudden voltage decrease of the high voltage bus 6' is coupled through the capacitor 142 to the bus 126. The coupling action of the capacitor 142 causes the voltage on the bus 126 to suddenly decrease to a negative value with respect to the bus 8'. The negative voltage on the bus 126 with respect to the bus 8' is coupled to the sensing transmitter 103 through the terminals 104 and 108. Normally, then, the voltage at the output terminal 107 of the sensing transmitter 103 is positive with respect to the voltage appearing at the output terminal 105 and the gating means or diode 110 will prevent conduction in the light sensing circuit since it is normally reverse biased. However, as is now apparent, when the flash tube 4' begins to conduct, the voltage at the output terminal 105 of the light sensing means 103 becomes positive with respect to the voltage appearing at the output terminal 107. The gating means or diode 110 will then be forward biased and allow a current to flow therethrough. The diode 106 will then be reverse biased thereby effectively disconnecting the switching means from the circuits. The current flowing through the diode 110 flows through the resistor 112 and resistor 113. That current establishes a voltage at the anode of the LASCR 111 which effectively powers or enables the sensing means or LASCR 111. The time interval between the activation of the switching means S2 connecting the input terminals 115 and 117 of the light sensing means 103 and the powering of the LASCR 111, is relatively short and therefore only a momentary contact is required from the switching means S2 for the proper operation of the system. A portion of the current flowing through the resistor 112 flows through the slider 114 and begins to charge the capacitor 118. When the sensing means or LASCR 111 is enabled, a sensor signal or current representative of the amount of light received thereby flows through its gate terminal to the integraging capacitor 120 and through the anticipation resistor 122. The function of the anticipation resistor 122 is fully explained in U.S. Pat. No. 3,519,879. The capacitor 118 provides a unique type of dynamic anticipation in addition to the anticipation resistor 122. The cooperative operation is this particular portion of the circuit will be hereinafter explained. For now however, it is sufficient to say that when the voltage stored by the integrating capacitor 120 as biased by the anticipation resistor 122, exceeds the voltage representative of the charge stored on the dynamic anticipation capacitor 118, the LASCR 111 becomes conductive thereby providing a low resistance path and an associated voltage decrease between the output terminals 105 and 107, and consequently between the bus 126 and the bus 8'. That voltage decrease is coupled through the capacitor 132 to the base terminal of the transistor 130 thereby causing the transistor 130 to turn off. With the transistor 130 non-conducting, a current will flow into the gate terminal of the SCR 140 thereby rendering it conductive. When the LASCR 140 becomes conductive a lower resistance path is presented to the capacitor 14' of the flash device 1' which causes the capacitor 14' to dump its charge. That action induces a triggering signal to appear at the quench tube triggering terminal 13' thereby initiating conduction in the quench tube 12'. The rapid discharge of the capacitor 14' produces a ringing action through the circuit comprising the capacitor 14', the SCR 140, and the transformer T2'. This ringing action is effective to turn off the SCR 140 after the quench tube triggering signal has been provided. After the quench tube 12' fires, the charge stored on the capacitor 2' of the light producing means 1 will disipate to a point where the voltage on the bus 6' is insufficient to support ionization in the quench tube 12' and the quench tube 12' will therefore turn off. The charging circuit connected to the terminals 3' and 7' of the light producing means 1' will begin to re-charge the capacitor 2'. The voltage appearing at the bus 6' will build up to a value sufficient to restore biasing voltage required to turn the transistors 130 and 148 on and the system shown in FIG. 2 will be returned to its normal condition to await the initiation of another cycle.

Dynamic anticipation acts to insure proper exposure of the light sensitive film in a camera even though the camera to subject distance is relatively small. The operation of anticipation circuitry including the integrating capacitor 120 the anticipation resistor 122 of FIG. 2 is explained in detail in U.S. Pat. No. 3,519,879. That invention essentially provided means whereby a turn-on voltage representative of an amount of light received by a light sensing means would automatically reflect the steep initial rise in light intensity when a flash tube is initiated. The use of the capacitor 118, the resistor 112 and the portion of the resistor 113 above the slide wire 114, provides an improvement over the circuitry shown in the above referenced patent. In that prior art device the turn on voltage presented to the gate terminal of the LASCR appeared when a flash tube was fired and increased proportionally to the light received by the LASCR. When the turn-on voltage exceeds a fixed threshold voltage present at the cathode of the LASCR, the LASCR would become conductive thereby effecting the apparent termination of the production of light by the flash tube. In prior art devices a light responsive or light sensing means such as an LASCR will not become conductive until the voltage representative of the amount of light received exceeded the threshold voltage present at the cathode terminal of the LASCR. The threshold voltage which had to be exceeded had been set at a fixed value heretofore. For example a curve may be plotted with the voltage representative of the light received as the ordinate and time as the abcissa. At a time T the voltage representative of the light received will exceed the fixed threshold voltage on the cathode of an LASCR the LASCR will become conductive. With the dynamic anticipation means in the present invention, the threshold voltage is not fixed but is initially zero volts and is increased with time as determined by the RC time constant of the resistor 112, the portion of the resistor 113 above the slide wire 114, and the dynamic anticipation capacitor 18. Using the dynamic anticipation means threshold voltage appearing at point 116 will be exceeded by the turn-on voltage representative of the light exceeded by the turn-on voltage representative of the light received by the LASCR 111 at a time T1 which occurs prior to the aforementioned time T. Therefore the LASCR 111 will be turned on sooner with the dynamic anticipation means and the over-exposure error due to additional light received after sufficient film exposure light has already been received, is reduced to a minimum. The over-exposure error avoided through the use of the dynamic anticipation means herein disclosed, is proportional to the light received by the camera between the two times T and T1.

Thus there has been provided an improved sensing transmitter for use with a switching means, and a flash device connected serially whereby an actuation of the switching means initiates the production of a source light from the flash device for the illumination of a scene, and the light sensing means is responsive to the scene light or the light received from the illuminated scene to generate a light terminating or quench signal effective to arrest the apparent production of light. The switching means may be part of an associated camera means. The improved sensing means is characterized by the use of a unique dynamic anticipation means which minimizes the over-exposure error heretofore unavoidable, especially in situations where the object to camera distance is relatively small. The improved sensing means is further characterized in that only two conductors are required to connect the sensing means with the flash device.

The embodiments of the invention in which an exclusive property or privilege is claimed are defined as follows:

1. A sensing transmitter for use with a remotely located control apparatus, said sensing transmitter comprising:

a first pair of terminals and a second pair of terminals, said first pair of terminals providing a connection to means for providing a first control signal, said second pair of terminals providing a connection to said remotely located control apparatus, all energizing power for said sensing transmitter being applied to said second pair of terminals from said remotely located control apparatus, said sensing transmitter further including means for transmitting said first control signal, through said second pair of terminals, to said remotely located control apparatus to effect a first control function thereat, sensing means for monitoring an effect produced as a result of said control function and providing a sensor signal in variable accordance therewith, and means responsive to said sensor signal for providing a second control signal whenever said sensor signal reaches a predetermined value, said second control signal also being applied to said second pair of terminals for transmission to said remotely located control apparatus to effect a second control function thereat.

2. A sensing transmitter as set forth in claim 1 and further characterized by the inclusion of gating means therein which normally maintains said sensing means in an inoperative condition, said gating means being responsive to a signal applied to said second pair of terminals indicative of the occurrence of said first control function for rendering said sensing means operative.

3. The invention as set forth in claim 2, wherein said means responsive to said sensor signal further includes means for providing a time-varying threshold signal whereby said second control signal is provided whenever said sensor signal and said threshold signal attain a predetermined relationship.

4. The invention as set forth in claim 3 wherein said gating means is a diode having an anode terminal and a cathode terminal, said diode anode terminal being connected to a first terminal of said first pair; and wherein said sensing means and said means responsive to said sensor signal comprise a Light Activated Silicon Controlled Rectifier (LASCR) having anode, cathode and gate terminals, said sensing means being a light responsive junction of said LASCR, said anode terminal of said LASCR being connected to said diode cathode terminal; said signal transmitter further including an integrating capacitor and an anticipation resistor connected in series between said LASCR gate terminal and a second terminal of said second pair; and said means for providing a time-varying threshold signal including: a capacitor connected between said LASCR cathode terminal and said second terminal of said first pair; and a voltage divider connecting said diode cathode terminal with said second terminal of said first pair, said voltage divider having a pick-off terminal thereon connected to said LASCR cathode terminal.

5. A sensing transmitter as set forth in claim 2 and further characterized by the inclusion of isolating means responsive to said last mentioned signal for effectively isolating said sensing transmitter from said means for producing said first control signal during the continuance of said signal applied to said second pair of terminals indicative of the occurrence of said first control function.

6. The invention as set forth in claim 5 wherein said isolating means is a diode having an anode terminal coupled to a second terminal of said first pair, and a cathode terminal coupled to said second terminal of said first pair.

7. The invention as set forth in claim 1 wherein said means for transmitting said first control signal includes:

a first transistor having base, collector, and emitter terminals said collector and emitter terminals being connected respectively to a first terminal of said second pair and a first terminal of said first pair; a resistor connecting said base terminal with said collector terminal; a first and second terminals diode having anode and cathode terminals, said cathode terminal being connected to said base terminal and said anode terminal being connected to a second terminal of said second pair; a first voltage divider means connecting a second terminal of said first pair with said second terminal of said second pair, said first voltage divider means having a pick-off terminal thereon; a second transistor having base collector and emitter terminals, said collector and emitter terminals of said second transistor being connected respectively between said first and second terminals of said second pair; a second diode having an anode terminal connected to said base terminal of said first transistor and a cathode terminal connected to said collector terminal of said first transistor; a first capacitor means connecting said emitter and base terminals of said first transistor; a second capacitor means connected between said pick-off terminal and said base terminal of said second transistor; and a third capacitor means connected between said pick-off terminal and said second terminal of said second pair.

8. The invention as set forth in claim 7 wherein said sensing means and said means responsive to said sensor signal comprise:

a light activated silicon controlled rectifier (LASCR) having anode cathode and gate terminals, said sensing means being a light responsive junction of said LASCR, said anode terminal of said LASCR being connected to said pick-off terminal; a first charge storage means connected between said first terminal of said first pair and said second terminal of said second pair; a second voltage divider means connected across said first charge storage means, said second voltage divider having a pick-off terminal connected to said cathode terminal of said LASCR; a second charge storage means connected between said cathode terminal of said LASCR and said second terminal of said second pair; an integration means connected between said gate terminal of said LASCR and said second terminal of said second pair, said integration means for integrating said sensor signal; and a third transistor having base, collector and emitter terminals, said collector and emitter terminals of said third transistor being connected across said integration means, and said base terminal of said third transistor being connected to said first terminal of said second pair.

9. The invention as set forth in claim 8 wherein said first and second charge storage means are capacitors, and said integration means includes:

a capacitor and a resistor serially connected between said gate terminal of said LASCR and said second terminal of said second pair.

10. The invention as set forth in claim 1 wherein said means for providing a first control signal includes a shutter switch of a photographic camera.

11. The combination comprising:
means for providing a first control signal;
first pair of terminals and second pair of terminals, said first pair of terminals providing a connection means to said means for providing said first control signal, said second pair of terminals providing a connection means to a remotely located control apparatus, all energizing power for said sensing transmitter being applied to said second pair of terminals from said remotely located control apparatus, means for transmitting said first control signal through said second pair of terminals to said remotely located control apparatus to effect a first control function thereat;

sensing means for monitoring an effect produced as a result of said control function and providing a sensor signal in variable accordance therewith; and means responsive to said sensor signal for providing a second control signal whenever said sensor signal reaches a predetermined value, said second control signal also being applied to said second pair of terminals for transmission to said remotely located control apparatus to effect a second control function thereat.

12. The invention as set forth in claim 11 wherein said means for providing said first control signal includes a shutter switch of a photographic camera.

13. The sensing transmitter as set forth in claim 1 wherein said means for transmitting said first control signal includes first and second connection means connecting respective terminals of said first and second pair of terminals.

14. The sensing transmitter as set forth in claim 13 wherein said sensing means and said means responsive to said sensor signal comprise:

a first diode means having anode and cathode terminals, said anode terminal being connected to said first connection means, a light activated silicon controlled rectifier (LASCR) having anode, cathode, and gate terminals, said LASCR anode terminal being connected to said first diode cathode terminal, an integrating means connecting said LASCR gate terminal with said second connection means, a voltage divider means connected between said first diode cathode terminal and said second connection means, said voltage divider means having a pick off terminal thereon connected to said LASCR cathode terminal, a capacitor means connecting said LASCR cathode terminal with said second connection means, and a second diode means having an anode terminal connected to said second connection means, and a cathode terminal connected to said first diode cathode terminal.

* * * * *